United States Patent [19]

Brupbacher et al.

[11] Patent Number: 4,915,903

[45] Date of Patent: * Apr. 10, 1990

[54] PROCESS FOR FORMING COMPOSITES HAVING AN INTERMETALLIC CONTAINING MATRIX

[75] Inventors: John M. Brupbacher; Leontios Christodoulou, both of Baltimore; Dennis C. Nagle, Ellicott City, all of Md.

[73] Assignee: Martin Marietta Corporation, Bethesda, Md.

[ * ] Notice: The portion of the term of this patent subsequent to Dec. 1, 2004 has been disclaimed.

[21] Appl. No.: 190,561

[22] Filed: May 5, 1988

Related U.S. Application Data

[63] Continuation-in-part of Ser. No. 873,890, Jun. 13, 1986, Pat. No. 4,774,052, which is a continuation-in-part of Ser. No. 662,428, Oct. 19, 1984, abandoned.

[51] Int. Cl.$^4$ .......................... C22C 1/00; C22C 32/00
[52] U.S. Cl. ..................... 420/129; 420/590; 148/407; 148/415; 148/328
[58] Field of Search .............. 420/129, 590, 417, 418, 420/552; 148/407, 415, 328

[56] References Cited

U.S. PATENT DOCUMENTS 4,710,348 12/1987 Brupbacher et al. ................ 420/129
4,774,052 9/1988 Nagle ................................... 420/129

*Primary Examiner*—L. Dewayne Rutledge
*Assistant Examiner*—David W. Schumaker
*Attorney, Agent, or Firm*—Herbert W. Mylius; Gay Chin

[57] ABSTRACT

A method is taught for the formation of intermetallic-second phase composite materials. The method involves the formation of a first metal-second phase composite comprising a relatively high loading of discrete, second phase particles distributed throughout a metal matrix, dilution of the first composite into an additional amount of metal to form a second composite comprising a lower loading of second phase particles within an intermediate metal matrix, and introduction of the second composite into another metal which is reactive with the intermediate metal matrix of the composite to form an intermetallic. A final intermetallic-second phase composite is thereby formed comprising a dispersion of discrete second phase particles throughout a final intermetallic matrix. The final intermetallic matrix may comprise a wide variety of intermetallic materials, with particular emphasis drawn to the aluminides and silicides. Exemplary intermetallics include $Ti_3Al$, $TiAl$, $TiAl_3$, $Ni_3Al$, $NiAl$, $Nb_3Al$, $NbAl_3$, $Co_3Al$, $Zr_3Al$, $Fe_3Al$, $Ta_2Al$, $TaAl_3$, $Ti_5Si_3$, $Nb_5Si_3$, $Cr_3Si$, $CoSi_2$ and $Cr_2Nb$. The second phase particulate materials may comprise ceramics, such as a borides, carbides, nitrides, oxides, silicides or sulfides, or may comprise an intermetallic other than the matrix intermetallic. Exemplary second phase particulates include $TiB_2$, $ZrB_2$, $HfB_2$, $VB_2$, $NbB_2$, $TaB_2$, $MoB_2$, $TiC$, $ZrC$, $HfC$, $VC$, $NbC$, $TaC$, $WC$, $TiN$, $Ti_5Si_3$, $Nb_5Si_3$, $ZrSi_2$, $MoSi_2$, and $MoS_2$.

51 Claims, No Drawings

PROCESS FOR FORMING COMPOSITES HAVING AN INTERMETALLIC CONTAINING MATRIX

CROSS REFERENCE TO RELATED APPLICATIONS

This application is a Continuation-In-Part of U.S. patent application Ser. No. 873,890, filed June 13, 1986, now U.S. Pat. No. 4,774,052, which is a Continuation-In-Part of U.S. patent application Ser. No. 662,928, filed October 19, 1984, now abandoned.

FIELD OF THE INVENTION

The present invention relates to composite materials comprising an intermetallic matrix having second phase particles dispersed therein. The intermetallic matrix may comprise a wide variety of intermetallic materials, with particular emphasis drawn to the aluminides and silicides of titanium, nickel, niobium and cobalt. The second phase may comprise ceramic materials, such as borides, carbides, nitrides, silicides, oxides or sulfides, or may comprise other intermetallic materials. The process for formation of the intermetallic-second phase composites of the present invention basically involves the in-situ precipitation of second phase particles within a metal matrix, followed by dilution of the particles in an additional amount of metal to form a composite of lower second phase loading. This composite is then introduced into another metal which reacts with the matrix metal to thereby form an intermetallic containing matrix.

BACKGROUND OF THE INVENTION

For the past several years, extensive research has been devoted to the development of metal-ceramic composites, such as aluminum reinforced with carbon, boron, silicon carbide, silica, or alumina fibers, whiskers, or particles. Metal-ceramic composites with good high temperature yield strengths and creep resistance have been fabricated by the dispersion of very fine (less than 0.1 micron) oxide or carbide particles throughout the metal or alloy matrix. However, this metal ceramic composite technology has not heretofore been extended to include intermetallic matrices. Prior art techniques for the production of metal-ceramic composites may be broadly categorized as powder metallurgical approaches, molten metal techniques, and internal oxidation processes.

The powder metallurgical type production of such dispersion-strengthened composites would ideally be accomplished by mechanically mixing metal powders of approximately 5 micron diameter or less with the oxide or carbide powder (preferably 0.01 micron to 0.1 micron). High speed blending techniques or conventional procedures such as ball milling may be used to mix the powder. Standard powder metallurgy consolidation techniques are then employed to form the final composite. Conventionally, however, the ceramic component is large, i.e., greater than 1 micron, due to a lack of availability, and high cost, of very small particle size materials since their production is energy intensive, time consuming, and costly in capital equipment. Furthermore, the production, mixing and consolidation of very small particles inevitably leads to contamination at the surface of the particles. Contaminants, such as oxides, inhibit interfacial binding between the ceramic phase and the matrix, thus adversely effecting ductility of the composite. Such weakened interfacial contact can also result in reduced strength, loss of elongation, and facilitated crack propagation. In addition, the matrix may be adversely effected, as in the case of titanium which is embrittled by interstitial oxygen. Further, in many cases where the particulate materials are available in the desired size, they are extremely hazardous due to their pyrophoric nature.

Alternatively, it is known that proprietary processes exist for the direct addition of appropriately coated ceramics to molten metals. Further, molten metal infiltration of a continous ceramic skeleton has been used to produce composites. In most cases, elaborate particle coating techniques have been developed to protect the ceramic particles from the molten metal during admixture or molten metal infiltration, and to improve bonding between the metal and ceramic. Techniques such as these have resulted in the formation of silicon carbide-aluminum composites, frequently referred to as SiC/Al, or SiC aluminum. This approach is only suitable for large particulate ceramics (e.g., greater than 1 micron) and whiskers, because of the high pressures involved for infiltration. In the molten metal infiltration technique, the ceramic material, such as silicon carbide, is pressed to form a compact, and liquid metal is forced into the packed bed to fill the interstices. Such a technique is illustrated in U.S. Pat. No. 4,444,603, of Yamatsuta et al, issued April 24, 1984. Because of the necessity for coating techniques and molten metal handling equipment capable of generating extremely high pressures, molten metal infiltration has not been a practical process for making metal-ceramic composites.

Because of the above-noted difficulties with conventional processes, the preparation of metal-ceramic composites with ceramic dispersoids in the micron size range has been extremely expensive.

Internal oxidation of a metal containing a more reactive component has also been used to produce dispersion strengthened metals, such as internally oxidized aluminum in copper. For example, when a copper alloy containing about 3 percent aluminum is placed in an oxidizing atmosphere, oxygen may diffuse through the copper matrix to react with the aluminum, precipitating alumina. This technique, although limited to relatively few systems since the two metals utilized must have a wide difference in chemical reactivity, has offered a feasible method for dispersion hardening. However, the highest possible level of dispersoids formed in the resultant dispersion strengthened metal is generally insufficient to impart significant changes in properties such as modulus, hardness, and the like. In addition, oxides are typically not wetted by the metal matrix, so that interfacial bonding is not optimum.

In recent years, numerous ceramics have been formed using a process referred to as self-propagating high-temperature synthesis (SHS), which involves an exothermic, self-sustaining reaction which propagates through a mixture of compressed powders. The SHS process involves mixing and compacting powders of the constituent elements, and igniting the green compact with a suitable heat source. On ignition, sufficient heat is released to support a self-sustaining reaction, which permits the use of sudden, low power initiation of high temperatures, rather than bulk heating over long times at lower temperatures. Exemplary of these techniques are the patents of Merzhanov et al. In U.S. Pat. No. 3,726,643, there is taught a method for producing high-melting refractory inorganic compounds by mixing at least one metal selected from groups IV, V, and VI of the Periodic System with a non-metal such as carbon, boron, silicon, sulfur, or liquid nitrogen, and locally heating the surface of the mixture to produce a local temperature adequate to initiate a combustion process. In U.S. Pat. No. 4,161,512, a process is taught for preparing titanium carbide by localized ignition of a mixture consisting of 80-88 percent titanium and 20-12 percent carbon, resulting in an exothermic reaction of the mixture under conditions of layer-by-layer combustion. These references deal with the preparation of ceramic materials, in the absence of a second non-reactive metallic phase.

U.S. Pat. No. 4,431,448 teaches preparation of a hard alloy by intermixing powders of titanium, boron, carbon, and a Group I-B binder metal, such as copper or silver, compression of the mixture, local ignition thereof to initiate the exothermic reaction of titanium with boron and carbon, and propagation of the reaction, resulting in an alloy comprising titanium diboride, titanium carbide, and the binder metal. This reference is limited to the use of Group I-B metals such as copper and silver, as binders. The process is performed with a relatively high volume fraction of ceramic and a relatively low volume fraction of metal (typically 6 volume percent and below, and almost invariably below 20 volume percent). The product is a dense, sintered material wherein the relatively ductile metal phase acts as a binder or consolidation aid which, due to applied pressure, fills voids, etc., thereby increasing density.

Another class of materials which has seen considerable interest and development is intermetallic materials, especially intermetallics of aluminum such as the aluminides of titanium, zirconium, iron, cobalt, and nickel.

The need for the advanced properties obtainable with intermetallic materials is typified by their potential application to structures capable of withstanding high temperatures, such as turbine engines. In designing and operating turbine engines today and for the foreseeable future, there are two primary problems which demand solutions from the field of materials science. The first of these is the need to operate certain portions of the engine at higher temperatures to improve operating efficiency and save fuel. The second problem is the need for lighter materials to decrease engine weight and engine operating stresses due to heavy rotating components, and to increase the operating life of disks, shafts, and bearing support structures. These latter structures require materials which are less dense than conventional nickel base superalloys, but which posses roughly the same mechanical properties and oxidation resistance as those materials in current usage.

Intermetallic compounds are particularly suited to these needs because of properties which derive from the fact that they possess ordered structures having regularly repeating (e.g., A B A B A B) atom sequencing. Modulus retention at elevated temperature in these materials is particularly high because of strong A-B bonding. In addition, a number of high temperature properties which depend on diffusive mechanisms, such as creep, are improved because of the generally high activation energy required for self-diffusion in ordered alloys.

The formation of long range order in alloy systems also frequently produces a significant positive effect on mechanical properties, including elastic constants, strength, strain-hardening rates, and resistance to cyclic creep deformation. Finally, in the case of aluminides, the resistance to surface oxidation is particularly good because these materials contain a large reservoir of aluminum that is preferentially oxidized.

However, during metallurgical processing, one problem encountered is that these materials tend to form coarse grains, which adversely effect workability, and which degrade certain mechanical properties, the most important of which is ductility. Also, in many intermetallics the strong A-B bonding results in low temperature brittleness, although the exact mechanism of the ductile-brittle transition seems to be different for the different intermetallic compounds. It is thus necessary to address the problem of minimal low temperature ductility without destroying the inherent high temperature strength and stiffness. In the prior art it has generally been considered that these latter high temperature properties may only be retained by preserving the ordered structure. However, little progress has been made in developing practical intermetallic compositions that possess sufficiently improved low temperature ductility while maintaining high temperature strength.

A conventional approach for improving the low temperature ductility of certain intermetallics involves the use of alloying additions. For example, it is known that polycrystalline $Ni_3Al$ can be made more ductile by adding small quantities of boron. U.S. Pat. No. 4,478,791 to Huang et al describes critical composition ranges over which such boron additions are beneficial. Alloying additions have also been used to effect crystal lattice changes to produce cubic crystal structures in various intermetallics. The formation of such cubic crystal structures roduces a greater number of available slip systems within the intermetallic materials, resulting in improved room temperature ductility. The formation of cubic L12 crystal structures has been the most prefered, because the L12 structure exhibits the highest degree of symmetry of all of the possible structures for ordered alloys and therefore possesses the greatest number of avilable slip systems. The choice of suitable alloying additions is governed both by the size of the atomic nuclei and the electronic band structure of the alloying elements. An example where modification of the lattice parameter of an intermetallic material is possible is in the substitution of Al by Ti in $Ni_3Al$ to form $Ni_3(Al,Ti)$. Also, the substitution of Co by Ni or Fe in $Co_3V$ has led to a series of face-centered cubic L12-type superlattices with greater ductility at ambient temperatures.

U.S. patent application Ser. No. 873,890, filed June 13, 1986, of which this application is a Continuation-In-Part, and which is hereby incorporated by reference, discloses several methods for the production of intermetallic-second phase composites. One embodiment teaches the formation of a first composite by the in-situ precipitation of second phase particles within a solvent metal matrix. This composite is then introduced into an additional metal which is reactive with the solvent metal to form an intermetallic containing matrix. The methods taught by the present invention are a modification of this process, in that an additional step is employed which consists of diluting the first composite in an additional amount of host metal to produce a second composite comprising a lower loading of the second phase particles within an intermediate metal matrix. This second composite is then introduced into another metal which reacts with the intermediate metal matrix to form an intermetallic containing matrix.

SUMMARY OF THE INVENTION

It is an object of the present invention to provide a method for forming a composite material of discretely dispersed particulate second phase material in an intermetallic containing matrix, particularly in an aluminide containing matrix. The dispersed second phase may constitute a ceramic, such as a boride, carbide, nitride, silicide, oxide or sulfide, or may constitute an intermetallic compound other than the matrix material.

It is a further object of this invention to provide a method for dispersion strengthening of intermetallics, such as aluminides, by forming a ispersion of in-situ precipitated second phase particles within a matrix of one or more intermetallic materials.

It is yet a further object of the invention to produce a composite having an intermetallic containing matrix which has fine grain size for improved ductility and mechanical properties while substantially retaining the high temperature characteristics of the intermetallic.

It is also an object of the present invention to provide an intermetallic composite material which may be subjected to conventional metallurgical processing steps, such as remelting, welding, heat treating, working, forging, extruding, rolling, etc.

Generally, the present invention relates to an improved process for forming composite materials comprising finely divided ceramic or intermetallic second phase particles in an intermetallic containing matrix. The process involves the in-situ precipitation of a relatively high volume percent of second phase particles within a solvent metal matrix to form a first composite. Thereafter, the first composite is introduced into a host metal to form a second composite comprising the second phase particles dispersed in an intermediate metal matrix. The second composite is then introduced into an intermetallic precursor metal, which reacts with the intermediate metal matrix to form an intermetallic containing matrix. A final composite is thereby produced comprising a substantially uniform dispersion of second phase particles within an intermetallic containing matrix.

The advantages of the present invention will become more readily understood by consideration of the following description and examples.

DESCRIPTION OF THE PREFERRED EMBODIMENTS

The present invention constitutes a process whereby constituents forming a second phase precipitate react in the presence of a solvent metal to form a first composite comprising a finely-divided dispersion of the second phase material in a matrix of the solvent metal. This first composite is then introduced into a host metal, which may be the same as, or different from, the solvent metal, to form a second composite comprising a lower loading of the second phase particles within an intermediate metal matrix. Thereafter, the intermediate metal matrix of the second composite is at least partially converted to an intermetallic by introducing the composite into an intermetallic precursor metal which is reactive with the intermediate metal matrix to form the desired intermetallic.

As was stated above, the process of the present invention is a modification of a method taught in U.S. patent application Ser. No. 873,890, filed June 13, for the production of intermetallic-second phase composites. The previously disclosed method involves the formation of a first composite comprising a dispersion of second phase particles within a solvent metal matrix. The solvent metal matrix of this composite is then converted to an intermetallic by introducing the composite into an additional metal which is reactive with the solvent metal to form the desired intermetallic matrix. By comparison, the method of the present invention involves an additional step of diluting the first composite in an additional amount of metal prior to conversion of the matrix to a final intermetallic matrix. The method of the present invention may therefore be viewed as a three step process which includes: (1) Reaction of second phase-forming constituents in the presence of a solvent metal to form a first composite comprising a dispersion of second phase particles in a solvent metal matrix; (2) Dilution of the first composite in a host metal to form a second composite comprising a lower loading of the second phase particles in an intermediate metal matrix; and (3) Introduction of the second composite into an intermetallic precursor metal which is reactive with the intermediate metal to form an intermetallic, thereby producing a final composite comprising second phase particles dispersed in an intermetallic containing matrix.

An advantage of the present process, and more particularly of dilution step (2) listed above, is that a relatively dense second composite is formed which may be more easily introduced into the intermetallic precursor metal. In accordance with step (3) listed above, a preferred method for the introduction of the second composite into the intermetallic precursor involves adding the composite to a molten bath of the intermetallic precursor metal. Since the first composites formed by step (1) above typically contain a large amount of porosity, addition of such low density, porous composites to molten intemetallic precursor metal would result in flotation of the composites on the surface of the melt, requiring additional time and/or equipment to mix the composites into the intermetallic precursor. In addition, the direct introduction of porous composites into molten intermetallic precursor metal could lead to the introduction of unwanted gases into the melt. The dilution step (2) alleviates these problems because a relatively dense second composite is formed which requires minimal effort to mix into the molten intermetallic precursor metal, and which introduces a lesser amount of gas into the melt. From a processing point of view, therefore, the dilution step (2) produces a second composite which is more readily introduced into a molten intermetallic precursor metal.

Another advantage is that operations such as mixing, cleaning, filtering, degassing and fluxing may be accomplished during the dilution step, leading to the removal of unwanted inclusions, agglomerates, porosity, etc., from the second composites formed. Also, the second composites produced may be worked by conventional methods, such as extruding or forging, to break up and disperse any agglomerated second phase particles which may be present. These processing techniques may result in the formation of second composites which, when introduced into an intermetallic precursor, act to form final intermetallic-second phase composites having superior properties. It is noted that the solvent and host metals may advantageously be chosen such that, during the dilution step, they form a metallic matrix which is easily processed by the above noted techniques.

A further advantage of the dilution step is that the particles formed during the reaction of step (1) are further dispersed in an additional amount of metal prior to introduction into the intermetallic precursor. This may aid in the dispersion of the second phase particles throughout the intermetallic matrix during step (3) noted above. In the production of first composites by the process of step (1), it has been found that second phase particles having the most desireable properties, such as small particle size, are typically formed in composites comprising from about 40 to about 60 volume percent second phase. From a geometrical standpoint, these relatively high particulate loadings require relatively close packing of the particles within the composite, i.e. the individual particles are separated from each other by a very thin layer of solvent metal, and in some cases may be in direct contact with each other. Diluting the particles in an additional amount of metal creates greater spacing between the particles, which in some instances may allow for more rapid and more complete dispersion of the particles within the final intermetallic matrix.

In accordance with the present invention, elements which are suitable for use as second phase-forming constituents include those elements which are reactive to form ceramics or intermetallics, such as aluminum, titanium, zirconium, hafnium, vanadium, niobium, tantalum, chromium, molybdenum, tungsten, iron, cobalt, nickel, copper, silicon, boron, carbon, sulfur, nitrogen, oxygen, thorium, scandium, lanthanum, yttrium, cerium and erbium. The second phase-forming constituents may be provided in elemental form, or may be provided as an alloy of the solvent metal. In addition, reactive compounds of such elements, such as boron nitride (BN), boron carbide ($B_4C$), boron oxide ($B_2O_3$), aluminum boride ($AlB_{12}$), aluminum carbide ($Al_4C_3$), aluminum nitride (AlN), silicon carbide (SiC), copper oxide (CuO) and iron oxide ($Fe_2O_3$) may also be used as a source of second phase-forming constituents.

Exemplary of suitable second phase particles are ceramics, such as borides, carbides, nitrides, oxides, silicides and sulfides of metals of the fourth to sixth groups of the Periodic Table. Particularly useful ceramic second phase particles include $TiB_2$, $ZrB_2$, $HfB_2$, $VB_2$, $NbB_2$, $TaB_2$, $MoB_2$, TiC, ZrC, HfC, VC, NbC, TaC, WC, TiN, $Ti_5Si_3$, $Nb_5Si_3$, $ZrSi_2$, $MoSi_2$ and $MoS_2$. While ceramic materials constitute the preferred second phase dispersoids, it is also possible to precipitate intermetallic materials as the second phase particles. In such instances, the particles and the matrix of the final composite formed must be of different intermetallic composition. While the discussion herein shall focus upon ceramic materials as the second phase, or dispersoid, it is noted that intermetallic second phases are also to be included in the scope of the present invention.

Complex compounds are also suitable as second phase particles. For example, the particles may comprise borides, carbides, or nitrides of at least two transition metals of the fourth to sixth groups of the Periodic Table, such as titanium niobium boride ($[Ti,Nb]_xB_y$) or titanium vanadium carbide ($[Ti,V]_xC_y$). Complex compounds containing one of the constituents of the final intermetallic matrix are often found to be very stable. For example, second phase particles of $[Ti,Nb]_xB_y$ are highly stable in both TiAl and $Nb_3Al$ intermetallic matrices. It has also been found that complex compounds, in some instances, tend to form whisker shaped particles, which may be beneficial in providing enhanced mechanical properties, such as creep resistance, in the final intermetallic-second phase composites formed.

It is especially to be noted that plural dispersoids may advantageously be dispersed in the final intermetallic matrix. This may be achieved by forming a first composite containing plural second phase materials within the solvent metal matrix. For example, titanium, boron and nitrogen second phase-forming constituents may be reacted in the presence of a solvent metal, such as aluminum, to form a first composite comprising a dispersion of $TiB_2$ and TiN particles within a matrix of the solvent metal. Alternatively, plural second phase particulate materials may be dispersed in the final intermetallic matrix by using multiple first composites. For example, a composite comprising $TiB_2$ particles in an aluminum matrix may be combined with another composite comprising TiN particles in an aluminum matrix. This combination may then be diluted in an additional amount of aluminum, followed by conversion of the aluminum to an intermetallic matrix, thereby forming a dispersion of $TiB_2$ and TiN particles within an intermetallic matrix.

In accordance with the present invention, the size of the second phase particles may range from about 0.01 to about 10 microns, and more preferably may range from about 0.01 to about 5 microns. It is possible, however, to produce second phase particles of larger size, depending upon the desired use of the intermetallic-second phase composites formed. Where the second phase particles are formed in the shape of whiskers, as in the case of complex ceramics such as titanium niobium boride, the whiskers may range in diameter from about 1 to about 5 microns and in length from about 5 to about 200 microns. More preferably, the whiskers may range in diameter from about 1 to about 3 microns and in length from about 5 to about 50 microns. The length to diameter, or aspect ratio of the whiskers may range from about 10:1 to about 100:1.

A wide range of second phase particle loadings are possible in the intermetallic-second phase composites of the present invention. The percentage of second phase particles may be varied considerably, depending upon the intended use of the final composite material. For dispersion strengthening purposes, second phase particle loadings of from about 1 to about 40 volume percent may be utilized. For grain refining applications, second phase loadings of from about 1 to about 10 volume percent may be used. In accordance with the process of the present invention, the first composites may be comprised of from about 20 to about 80 volume percent second phase particles, while the second composites may be comprised of from about 2 to about 60 volume percent second phase particles. Further, the final composites may comprise from about 1 to about 40 volume percent second phase.

As the solvent metal, one may use at least one metal or metal alloy capable of dissolving or at least sparingly dissolving at least one of the second phase-forming constituents and having a lesser capability for dissolving or otherwise reacting with the formed second phase particles. Thus, at the temperatures experienced during the second phase-forming reaction, the solvent metal may act as a solvent for the second phase-forming constituents, but not for the desired second phase particles.

As the host metal, one may use an additional amount of the solvent metal, or one may use a metal or metal alloy which forms an alloy with the solvent metal. Also, in some cases, it may be desirable to use a host metal which forms an intermetallic with the solvent metal. During the process of diluting the first composite into the host metal, which typically involves holding the solvent metal/host metal mixture in the molten state, the molten metal must remain substantially inert with respect to the second phase particles. In other words, the second phase particles must remain stable in a melt of the solvent metal/host metal mixture for an amount of time sufficient to complete the dilution step. In addition, the intermediate matrix formed by the combination of the solvent and host metals must be capable of reacting with an intermetallic precursor metal to form an intermetallic containing matrix. Therefore, while the potential choice of solvent and host metals is large, this choice is limited by adherence to the criteria noted above.

Suitable solvent and host metals include aluminum, nickel, copper, titanium, cobalt, iron, platinum, gold, silver, niobium, tantalum, boron, zinc, molybdenum, yttrium, hafnium, tin, tungsten, lithium, magnesium, beryllium, thorium, silicon, chromium, vanadium, zirconium, manganese, scandium, lanthanum, cerium and erbium. Preferred solvent and host metals include aluminum, nickel, titanium, cobalt, iron, copper, niobium, silicon and beryllium. Aluminum is particularly preferred as both the solvent and host metal in the embodiments of the present invention wherein a final composite comprising an aluminide matrix is formed.

As the intermetallic precursor metal, one may use a metal or metal alloy capable of forming an intermetallic with the intermediate matrix metal. Suitable intermetallic precursor metals include titanium, aluminum, nickel, copper, cobalt, iron, platinum, gold, silver, niobium, tantalum, boron, zinc, molybdenum, yttrium, hafnium, tin, tungsten, lithium, magnesium, beryllium, thorium, silicon, chromium, vanadium, zirconium, manganese, scandium, lanthanum, cerium and erbium. Preferred intermetallic precursor metals include titanium, aluminum, nickel, cobalt, niobium, silicon, iron, copper and beryllium. In selecting an intermetallic precursor metal for a given intermediate metal matrix-second phase system, it is important to prevent an undesireable amount of second phase particle dissolution or growth during formation of the intermetallic matrix. Minimizing particle growth, for example, is important for applications such as dispersion strengthening and grain refinining. More particularly, for grain refining purposes, it is desireable to utilize second phase particles having sizes of less than about 10 microns, and preferably less than 3 microns. For the purpose of dispersion strengthening, it is desireable to utilize second phase particles having sizes of less than about 10 microns, and preferably less than 1 micron. However, a certain amount of second phase particle growth may be acceptable in some instances. For example, composites having relatively large second phase particles may be useful for the fabrication of components requiring a high degree of wear resistance, such as cutting tools. While the choice of possible intermetallic precursor metals for a given intermediate metal matrix-second phase system is large, this choice is limited by the degree to which the intermetallic metal promotes unwanted growth or dissolution of the second phase particles during processing.

The intermetallic matrix of the present invention may be comprised of a wide variety of intermetallic materials. A preferred class of intermetallic materials are the aluminides and silicides. Among the metallic elements capable of forming aluminides are titanium, nickel, iron, cobalt, and refractory metals such as niobium, zirconium, tantalum, molybdenum, vanadium, and the like.

Among the metallic elements capable of forming silicides are titanium, niobium, chromium, cobalt, nickel, and vanadium. Specific intermetallic matrix materials include $Ti_3Al$, $TiAl$, $TiAl_3$, $Ni_3Al$, $NiAl$, $Nb_3Al$, $Nb_2Al$, $NbAl_3$, $Co_3Al$, $ZrAl_3$, $ZrAl_2$, $Zr_2Al_3$, $Zr_4Al_3$, $Zr_3Al_2$, $Zr_3Al$, $Fe_3Al$, $Ta_2Al$, $TaAl_3$, $Mo_3Al$, $MoAl_2$, $VAl_3$, $VAl$, $Ti_5Si_3$, $Nb_5Si_3$, $Cr_3Si$, $Cr_2Si$, $V_5Si_3$, $Ni_3Si$, $CoSi_2$ and $Cr_2Nb$. Plural intermetallic materials may be present in the final matrix. For example, an intermetallic matrix may be comprised of a two phase mixture of $TiAl$ and $Ti_3Al$, or alternatively of a two phase mixture of $TiAl_3$ and $TiAl$. Also, substitution of one or more elements within an intermetallic compound is possible, and may be desirable to effect crystal lattice changes or to broaden line compounds. Exemplary of a system in which crystal lattice changes are effected is the substitution of aluminum by titanium in $Ni_3Al$ to form $Ni_3(Al, Ti)$.

It is noted that the intermetallic containing matrices of the present invention exhibit relatively fine grain size. For instance, an as-cast ingot comprising $TiAl$ (gamma) intermetallic reinforced with 5 volume percent $TiB_2$ second phase particles typically exhibits an average colony size of approximately 30 microns. In general, the average grain size of aluminide matrices produced by the present invention may range from about 0.1 micron to about 200 microns, and more preferably may range from about 1 micron to about 40 microns. The fine grain size achievable by the process of the present invention is thought to increase ambient temperature ductility of the intermetallic matrices by reducing dislocation stress at grain boundaries as a result of reduced slip length. Fine grain size also results in a larger number of suitably oriented grains for dislocation activity, an effective means of improving ductility. In addition, fine grain size is a critical factor in increasing fabricability of the material.

It should be recognized that the intermetallic materials of the present invention are not necessarily of precise stoichiometric compositions. For example, nickel aluminide is commonly referred to as $Ni_3Al$ although it is an intermetallic phase and not a simple ionic or covalently bonded compound, as it exists over a range of compositions as a function of temperature, i.e. about 72.5 to 77 weight percent nickel (85.1 to 87.8 atomic percent) at about 600° C. Thus, the intermetallic matrices of the present invention may be defined as the compounds which form upon solidification of near stoichiometric amounts of the intermediate metal and intermetallic precursor metal.

While the terms "intermetallic containing matrix" and "intermetallic matrix" are used in this disclosure to define a matrix which is predominantly intermetallic, other materials, such as the individual constituents of the intermetallic, or additional alloying metals, may also be present in lesser amounts. Furthermore, the intermetallic matrix may have a number of substitutional or interstitial elements present, for example oxygen may be present in a $TiAl$ matrix, or titanium may be present in a $Ni_3Al$ matrix.

As was stated above, the method of the present invention involves a three step process which includes: (1) Reaction of second phase-forming constituents in the presence of a solvent metal to form a first composite comprising a dispersion of second phase particles in a solvent metal matrix; (2) Dilution of the first composite in a host metal to form a second composite comprising a lower loading of the second phase particles in an intermediate metal matrix; and (3) Introduction of the second composite into an intermetallic precursor metal which is reactive with the intermediate metal matrix to form an intermetallic, thereby producing a final composite comprising second phase particles dispersed in an intermetallic containing matrix.

In step (1) various techniques may be used to initiate the second phase-forming reaction to thereby form the first composite. Each of these techniques involves the preparation of a mixture of the second phase-forming constituents, along with at least one solvent metal which acts to form the metal matrix. The mixture is then reacted by the techniques described below to form a dispersion of second phase particles within the solvent metal matrix. In each of the following embodiments, the second phase-forming constituents may be provided in the form of elemental powders, or at least one of the constituents may be provided in the form of an alloy of the solvent metal. In addition, at least one of the second phase-forming constituents my be provided from a reactive compound.

In one embodiment, the second phase-forming reaction is initiated by bulk heating a mixture comprising the second phase-forming constituents and at least one solvent metal. In accordance with the bulk heating process, the starting mixture is preferably compressed to form a compact which is then heated in, for example, a furnace to initiate the second phase-forming reaction. The reaction typically occurs at a temperature approximating the melting temperature of the solvent metal. Bulk heating may also be achieved by plasma spray techniques in which the starting mixture is introduced into a plasma flame. The starting mixture may be in the form of elemental or mechanically alloyed powders. U.S. Pat. No. 4,710,348 to Brupbacher et al, hereby incorporated by reference, gives a detailed description of bulk heating techniques which are suitable for use in producing the first composites of the present invention.

In an alternative embodiment, first composites comprising second phase particles dispersed in a solvent metal matrix are formed using a local ignition process. In this process a mixture comprising the second phase-forming constituents and at least one solvent metal is compressed to form a green compact, followed by local ignition to initiate a reaction wave front which moves along the compact. The propagating reaction results in the in-situ precipitation of substantially insoluble second phase particles in the solvent metal matrix. The porosity of the first composites produced by this embodiment is relatively high. For example, porosity in most cases exceeds about 10 percent, and may often exceed about 25 percent. U.S. patent application Ser. No. 927,014, filed November 5, 1986, which is hereby incorporated by reference, gives a detailed description of local ignition techniques which are suitable for the formation of the first composites of the present invention.

Another alternative embodiment for the initiation of the second phase-forming reaction of step (1) involves a direct addition process. In this approach, a mixture comprising the second phase-forming constituents and at least one solvent metal is added to a molten bath of the solvent metal, resulting in the in-situ formation of second phase particles within the solvent metal matrix. The mixture may be added to the molten solvent metal in the form of a preform or compact. It is to be noted that a solvent metal must be present in the preform or compact to facilitate the reaction of the second phase-forming constituents. U.S. patent application Ser. No. 927,031, filed November 5, 1986, which is hereby incorporated by reference, gives a detailed description of direct addition techniques which may be applied to the formation of the first composites of the present invention.

Step (2), which involves the dilution of first composites produced by the methods discussed above into a host metal, may be accomplished in several ways. The first composite may be added in solid form to a molten bath of the host metal. In this case, the first composite may be crushed to a convienient size and then added to a melt of the host metal. Dispersion of the second phase particles in the melt may be facilitated by melt agitation generated by mechanical stirring, gas bubbling, induction stirring, ultrasonic energy, and the like. A preferred method, for example, in the addition of a first composite containing about 50 volume percent titanium diboride in an aluminum solvent metal matrix to host aluminum, is to heat the host metal to 750° C., crush and slowly add the first composite to the melt while mechanically stirring, continue stirring the melt for 10 minutes, and cast the melt at 750° C. While in the molten state, various clean-up techniques, such as the use of fluxes, scavengers and the like, can be employed to remove impurities, such as oxides, from the melt.

In an alternative embodiment of step (2), the first composite and host metal are placed together in solid form, followed by heating to melt the metals and to disperse the second phase particles within the molten solvent metal/host metal mixture. Heating may be achieved in any suitable device, such as a furnace or casting unit. A particularly preferred technique is to use an arc-melting device to effect heating of the first composite-host metal mixture. In this instance, an electrode is formed consisting of a compact of the first composite and host metal which is then arc-melted in a conventional manner. This technique is especially suited to the formation of large amounts of the second composites of the present invention. During the process of step (2) it is also possible to add additional alloying metal along with the first composite into the host metal. U.S. patent application Ser. No. 937,032, filed November 5, 1986, which is hereby incorporated by reference, gives a detailed description of dilution techniques which are adaptable for use in the process of the present invention wherein first composites are diluted in a host metal to form a second composite comprising a lower loading of second phase particles dispersed in an intermediate metal matrix.

Step (3), which involves introduction of the second composites formed by the techniques above into an intermetallic precursor metal to form a final composite comprising second phase particles in an intermetallic matrix, may be accomplished in a manner similar to the dilution of step (2). That is, the second composite may be added in solid form to a molten bath of the intermetallic precursor metal, or alternatively, the second composite and the intermetallic precursor metal may be placed together in solid form, followed by a heating step. During the introduction of the second composite into the intermetallic precursor metal, the intermediate metal matrix of the second composite reacts with the intermetallic precursor metal to form the desired intermetallic. Dispersion of the second phase material in the melt may be facilitated by melt agitation generated by arc melting, mechanical stirring, induction stirring, magnetic stirring, gas bubbling, ultrasonics, and the like. Once dispersion of the second phase material is complete, the melt may be solidified by conventional techniques such as chill casting to yield very low porosity final composites. During the process of step (3) it is also possible to introduce additional materials, such as alloying additions or additional composite materials, along with the second composite into the intermetallic precursor metal. For instance, an additional amount of the solvent metal may be introduced along with the second composite into the intermetallic precursor metal to adjust the stoichiometery of the final intermetallic matrix formed. Alternatively, an alloying metal which acts to alter the characteristics of the final intermetallic matrix, for example, by changing the crystal lattice structure of the intermetallic, may be introduced along with the second composite into the intermetallic precursor metal. Further, an additional amount of composite material, such as a first composite produced in accordance with the present invention, may be introduced along with the second composite into the intermetallic precursor metal. U.S. patent application Ser. No. 873,890, filed June 13, 1986, listed previously, gives a detailed description of a process whereby a composite comprising finely dispersed second phase particles in a metal or metal alloy matrix is introduced into a metal which is reactive with the matrix to thereby form an intermetallic containing matrix. This technique is adaptable for use in step (3) of the present invention wherein second composites are introduced into an intermetallic precursor metal to produce a final composite comprising second phase particles dispersed throughout an intermetallic containing matrix.

It is noted that step (3) generally involves high temperatures, e.g., above the melting point of the intermetallic matrix to be formed. As a result of the time/temperature regime to which the second phase particles are exposed, a certain amount of particle dissolution may be experienced. Consequently, a certain amount of the second phase constituents may be present in solution within the melt. It has been found that the cooling rate used during solidification of the melt may have a significant effect on the second phase particle size and/or morphology in the final composites produced. For example, slow cooling rates may allow for particle growth during solidification, due to the re-precipitation of second phase material at the surface of the non-dissolved particles. Alternatively, fast cooling rates, achieved by rapid solidification techniques and the like, may result in the formation of extremely fine, metastable second phase particles. The control of cooling rates therefore allows for a certain amount of control over the size of the second phase particles present within the final composites. It is recognized that, since a certain amount of second phase particle dissolution or reaction may occur during the process of the present invention, the second phase particles present within the final composites produced may not necessarily posses the same characteristics as the particles originally produced by the second phase-forming reaction. For example, the particles of second phase material present in the final composites may be of a different size and/or morphology than those of the first composites.

It is further noted that if a large amount of second phase particle dissolution does occur in step (3) of the present invention, it may be possible to heat treat the resultant material in order to promote the re-precipitation of second phase particles. The heat treatment may be varied to alter the size and/or morphology of the re-precipitated second phase, with the possibility of producing very fine, well dispersed particles, and also the possibility of producing particles of controlled morphology, such as whiskers.

When produced in the form of ingots or billets, the final intermetallic-second phase composites of the present may then be subjected to conventional metallurgical processing steps, such as remelting, heat treating, working, forging, extruding, rolling, etc. In addition, the ingots or billets may be remelted and rapidly solidified to produce a powder which may then be spray formed, plasma spray deposited, etc. There is relatively little effect of cooling rate on the matrix grain size achieved in ingots produced by the methods of the present invention. This is directly contrary to most non-reinforced cast intermetallic ingots, such as titanium aluminides, which typically exhibit increasing grain size with decreasing cooling rates. As a consequence, it has been difficult to achieve small grain size in conventional non-reinforced intermetallic ingots, since slow cooling rates are required during processing in order to avoid cracking of the cast ingot.

The following examples illustrate various steps in accordance with the present invention. More particularly, examples 1 through 18 illustrate the production of first composites which are suitable for further dilution. Examples 19 through 28 illustrate the dilution of first composites into host metals to form second composites. Examples 29 through 40 illustrate the introduction of second composites into intermetallic precursor metals to form the final intermetallic-second phase composites of the present invention.

EXAMPLE 1

A mixture of powders comprising 34 percent by weight titanium, 16 percent by weight boron and 50 percent by weight aluminum, is isostatically compacted to 38,000 pounds per square inch. The compacted artifact is then heated in a furnace set at a temperature of 800° C. Upon reaching approximately 670° C., a rapid increase in temperature to approximately 1250° C. is noted. The rate of increase in temperature is very rapid (greater than 900° C. per minute) followed by a fast cool down rate of approximately 400° C. per minute. On subsequent examination, the first composite formed is found to contain a fine dispersion (0.1–3 microns) of substantially unagglomerated titanium diboride second phase particles in an aluminum solvent metal matrix.

EXAMPLE 2

Titanium, boron, and aluminum powders are ball-milled in the proper stoichiometric proportions to provide 60 weight percent titanium diboride second phase in an aluminum solvent metal matrix. The mixture is then packed in gooch tubing and isostatically pressed to 40 ksi, forming a compact approximately 1 centimeter in diameter by 5 centimeters long and having a density of 2.39 grams per cubic centimeter. The compact is then placed end to end with a graphite rod in a quartz tube under flowing argon at atmospheric pressure. The graphite rod is heated in a radio frequency field which initiates a reaction at the interface of the compact and the rod. The reaction propagates the length of the compact at a rate of 0.77 centimeters per second. Analysis of the resultant first composite reveals a dispersion of substantially unagglomerated titanium diboride second phase particles having an average size of approximately 1 micron in an aluminum solvent metal matrix.

EXAMPLE 3

Niobium, boron, and aluminum powders are mixed in the proper stoichiometric proportions to provide 50 weight percent niobium diboride second phase in an aluminum solvent metal matrix. The mixture is packed in gooch tubing and isostatically pressed to 40 ksi, forming a compact. The compact is then placed in a quartz tube under flowing argon at atmospheric pressure and heated in a radio frequency field to initiate a reaction of the compact. A first composite is thereby formed comprising substantially unagglomerated niobium diboride second phase particles ranging in size from about 1 to about 7 microns dispersed in an aluminum solvent metal matrix.

EXAMPLE 4

239.5 grams of titanium powder, 60.3 grams of carbon black, and 200.2 grams of aluminum powder are ball-milled for 30 minutes, packed in gooch tubing, and isostatically pressed to 40 ksi, forming a compact 1 inch in diameter by 12 inches long. The compact is placed on two water cooled copper rails in a 4 inch diameter quartz tube under flowing argon. A 1 inch by 1 inch piece of carbon placed next to one end of the compact is induction heated until an exothermic reaction is initiated at the end of the compact. Power to the induction unit heating the carbon is turned off and the reaction is allowed to propagate the length of the compact. Analysis of the first composite formed reveals a dispersion of titanium carbide second phase particles within an aluminum solvent metal matrix. The titanium carbide particles have an average size of approximately 1 micron.

EXAMPLE 5

An experiment is conducted whereby molybdenum disilicide second phase particles are precipitated in an aluminum solvent metal matrix. A mixture of approximately 15 weight percent silicon, 25 weight percent molybdenum, and 60 weight percent aluminum powders is compacted and subsequently heated in a furnace. On attainment of a temperature of approximately 640° C., a sudden exotherm is noted. Subsequent X-ray and SEM analyses of the resultant first composite confirm the presence of molybdenum disilicide second phase particles in an aluminum solvent metal matrix.

EXAMPLE 6

A mixture of 20.5 weight percent titanium, 9.5 weight percent boron and 70 weight percent cobalt is isostatically pressed to 40 ksi and heated in a furnace. A highly exothermic reaction occurs at 800° C., with a temperature rise to about 1600° C. Subsequent X-ray analysis of the resultant first composite identifies the presence of titanium diboride second phase particles in a cobalt solvent metal matrix. It is shown here that if sufficient diffusion of the second phase-forming constituents into the solid solvent metal can occur, the initiation temperature of the second phase-forming reaction can be below the melting point of the solvent metal, which in this case is 1495° C., and the reaction may be initiated in the solid state.

EXAMPLE 7

A mixture of 20.6 weight percent titanium, 9.4 weight percent boron and 70 weight percent chromium is compacted to 40 ksi and then heated in a furnace. A rapid exothermic reaction is noted at approximately 880° C. The resultant first composite comprises titanium diboride second phase particles in a chromium solvent metal matrix.

EXAMPLE 8

A mixture of 16 weight percent aluminum, 56 weight percent chromium, 20.6 weight percent titanium, and 9.4 weight percent boron is compacted and subsequently heated in a furnace. On attainment of a temperature of about 620° C., a rapid reaction occurs, resulting in a temperature increase to over 800° C. and melting of the chromium. The temperature-time curve shows a double peak, indicating an exothermic reaction in aluminum (which typically occurs between 600°-680° C.) and a subsequent reaction in the chromium. The lower melting aluminum solvent metal therefore acts as a "low temperature initiator" for the reaction, which releases heat and induces further reaction in the higher melting chromium solvent metal. The first composite produced comprises titanium diboride second phase particles in a solvent metal matrix of chromium-aluminum alloy.

EXAMPLE 9

A mixture of approximately 40 weight percent zirconium, 20 weight percent boron and 40 weight percent copper powders is compacted and then heated in a furnace until a rapid exothermic reaction occurs. X-ray and SEM analyses of the resultant first composite show the presence of zirconium diboride second phase particles in a copper solvent metal matrix.

EXAMPLE 10

The following example illustrates the formation of a first composite comprising titanium vanadium carbide ($[Ti,V]_xC_y$) second phase particles of elongated shape dispersed within an aluminum solvent metal matrix. 37 grams of Ti powder ($-100$ mesh), 13 grams of V powder ($-325$ mesh), 10 grams of C powder ($-325$ mesh) and 40 grams of Al powder ($-325$ mesh) are ball milled and isostatically pressed to 40 ksi to form a compact. The compact is heated in a radio frequency field to initiate an exothermic reaction. SEM analysis of the resultant first composite reveals titanium vanadium carbide second phase particles of elongated shape having widths of approximately 3 to 5 mircons and lengths of approximately 10 to 80 microns dispersed in a solvent metal matrix of Al.

EXAMPLE 11

The following example illustrates the formation of a first composite comprising titanium zirconium carbide ($[Ti,Zr]_xC_y$) second phase particles of elongated shape dispersed within an aluminum solvent metal matrix. Powders of $Al_4C_3$, Zr, Ti and Al are ball milled and isostatically pressed to 40 ksi to form a compact. The compact is heated in a radio frequency field to initiate an exothermic reaction. SEM analysis of the resultant first composite reveals titanium zirconium carbide second phase particles of elongated shape having widths of approximately 2 to 4 microns and lengths of approximately 10 to 40 microns dispersed in a solvent metal matrix comprising Al.

EXAMPLE 12

Ti, Nb, B and Al powders ($-325$ mesh) are blended, packed in gooch tubing and isostatically pressed to 40 ksi to form a compact. The compact is placed on a water cooled cold finger in a quartz tube under flowing argon and is heated in a radio frequency field to initiate a reaction of the compact. Analysis of the resultant first composite reveals a dispersion of titanium niobium boride ($[Ti,Nb]_xB_y$) whiskers within an aluminum solvent metal matrix. The aspect ratio of the wiskers is greater than 20:1.

EXAMPLE 13

A mixture of BN, Ti and Al powders is compacted and heated to ignition at about 730° C., marked by a sudden temperature rise. X-ray and SEM analyses of the resultant first composite confirm the presence of $TiB_2$ and TiN second phase particles dispersed in an Al solvent metal matrix with a particle loading of about 50 weight percent. The size of the $TiB_2$ and TiN second phase particles ranges from about 1 to 10 microns.

EXAMPLE 14

A similar experiment to the one described in Example 13 is performed except that copper is used as the solvent metal. Ignition in copper occurs at about 900° C. X-ray and SEM analyses confirm the presence of $TiB_2$ and TiN second phase particles dispersed in a Cu solvent metal matrix with a particle loading of about 50 weight percent. The size of the $TiB_2$ and TiN second phase particles is less than about 1 micron.

EXAMPLE 15

$B_4C$, Ti and Cu powders are mixed, compacted to 40 ksi and heated in a radio frequency field. A second phase-forming reaction is initiated at a temperature of about 850° C. Subsequent analysis of the resultant first composite reveals a dispersion of $TiB_2$ and TiC second phase particles in a Cu solvent metal matrix with a particle loading of about 30 weight percent.

EXAMPLE 16

26.9 grams of $AlB_{12}$ powder (−200 mesh), 49.3 grams of Ti powder (−325 mesh) and 23.8 grams of Al powder (−325 mesh) are ball milled for 30 minutes, packed in gooch tubing and isostatically pressed to 42 ksi. The compact is placed on two water cooled copper rails in a quartz tube under flowing argon and inductively heated to initiate an exothermic reaction. X-ray and SEM analyses of the resultant first composite reveal $TiB_2$ second phase particles having an approximate size range of 0.2 to 0.5 microns dispersed in an aluminum solvent metal matrix. The $TiB_2$ particles comprise approximately 74 weight percent of the first composite.

EXAMPLE 17

Powders of AlN, Ti and Al in the proper stoichiometric proportions to produce a first composite comprising 60 weight percent TiN second phase particles in an aluminum solvent metal matrix are ball milled and then compacted to 40 ksi. The compact is placed on a water cooled copper boat in a quartz tube under flowing argon and inductively heated to initiate an exothermic reaction. The resultant first composite comprises TiN second phase particles of a generally rod-like shape having widths of approximately 1 to 2 microns and lengths of 5 to 10 microns dispersed in an aluminum solvent metal matrix.

EXAMPLE 18

80 grams of Ti powder, 20 grams of C powder and 100 grams of Al powder are mixed, placed in gooch tubing and isostatically pressed to 40 ksi to form a compact. The compact is then added to molten aluminum at 750° C. in the proper proportion to yield approximately 25 weight percent titanium carbide second phase particles in an aluminum solvent metal matrix. The melt is then cast in conventional manner to form a first composite comprising a dispersion of titanium carbide second phase particles in aluminum solvent metal matrix.

EXAMPLE 19

A first composite comprising 40 weight percent TiC second phase particles dispersed in an Al solvent metal matrix produced as in Example 4 is diluted in aluminum host metal by crushing the first composite to minus 16 mesh and slowly adding to molten aluminum host metal at 770° C. while mechanically stirring. The melt is maintained at 770° C. and stirred vigorously for several minutes. The melt is then fluxed with chlorine gas for 15 minutes, skimmed, and cast. The resultant second composite comprises approximately 19 weight percent titanium carbide second phase particles in an aluminum intermediate metal matrix. The average size of the titanium carbide particles is approximately 1 micron, indicating that no significant second phase particle growth occured during the dilution step.

EXAMPLE 20

1,000 grams of first composite material, prepared as in Example 2, comprising 60 weight percent titanium diboride second phase particles in an aluminum solvent metal matrix are crushed and then added to 1,610 grams of molten aluminum host metal while stirring. The resultant melt is then cast in a conventional manner to yield a second composite comprising about 23 weight percent titanium diboride second phase particles dispersed in an aluminum intermediate metal matrix. The average size of the titanium diboride particles is approximately 1 micron, indicating that essentially no second phase particle growth occured during the dilution step.

EXAMPLE 21

1,000 grams of first composite material, prepared as in Example 2, comprising 60 weight percent titanium diboride second phase particles in an aluminum solvent metal matrix are mixed with 1,610 grams of solid host aluminum, and then heated in a furnace to about 750° C. so as to melt the host aluminum. The dilution of the first composite into host aluminum yields a second composite comprising about 23 weight percent titanium diboride second phase particles dispersed in an aluminum intermediate metal matrix. The average size of the titanium diboride particles is approximately 1 micron, indicating that essentially no second phase particle growth occured during the dilution step.

EXAMPLE 22

1,000 grams of first composite material, prepared as in Example 2, comprising 60 weight percent titanium diboride second phase particles in an aluminum solvent metal matrix are crushed to minus 16 mesh and then mixed with 1,610 grams of solid host aluminum shot. The mixture is compressed to form a compact which is then melted in an electric-arc furnace to produce an ingot of second composite material comprising about 23 weight percent titanium diboride second phase particles dispersed in an aluminum intermediate metal matrix.

EXAMPLE 23

Powders of Ti and C second phase-forming constituents and Al solvent metal are reacted in the proper proportions to form a first composite containing 70 weight percent TiC second phase particles in an Al solvent metal matrix. Powders of Ti and B second phase-forming constituents and Al solvent metal are reacted in the proper proportions to form another first composite containing 70 weight percent $TiB_2$ second phase particles in an Al solvent metal matrix. 200 grams of each of the first composites are added to 1,000 grams of molten host aluminum at 850° C. and stirred. The resultant melt is then cast in a conventional manner to form a second composite comprising a dispersion of TiC and $TiB_2$ particles within an aluminum intermediate metal matrix. The total second phase particle loading of the second composite is about 20 weight percent (10 weight percent TiC plus 10 weight percent $TiB_2$).

EXAMPLE 24

1,000 grams of a first composite, prepared as in Example 9, containing 60 weight percent zirconium diboride second phase particles in a copper solvent metal matrix is crushed to minus 16 mesh and then added to 1,400 grams of molten aluminum host metal while mechanically stirring. The resultant second composite comprises about 25 weight percent zirconium diboride second phase particles in an intermediate metal matrix of copper-aluminum alloy.

EXAMPLE 25

1,000 grams of a first composite, prepared as in Example 9, containing 60 weight percent zirconium diboride second phase particles in a copper solvent metal matrix is crushed to minus 16 mesh and then added to 1,400 grams of molten beryllium host metal while mechanically stirring. The resultant second composite comprises about 25 weight percent zirconium diboride second phase particles in an intermediate metal matrix of copper-beryllium alloy.

EXAMPLE 26

A first composite comprising 30 weight percent $TiB_2$ second phase particles in a Co solvent metal matrix, prepared as in Example 6, is added to an equal weight of molten Co host metal and stirred. The melt is cast in a conventional manner. The resultant second composite comprises about 15 weight percent $TiB_2$ particles dispersed in a Co intermediate metal matrix.

EXAMPLE 27

A first composite comprising 30 weight percent $TiB_2$ second phase particles in a Cr solvent metal matrix, prepared as in Example 7, is added to an equal weight of molten Cr host metal and stirred. The melt is cast in a conventional manner. The resultant second composite comprises about 15 weight percent $TiB_2$ particles dispersed in a Cr intermediate metal matrix.

EXAMPLE 28

A first composite prepared as in Example 12 comprising approximately 50 weight percent titanium niobium boride ($[Ti,Nb]_xB_y$) whisker shaped particles within an aluminum solvent metal matrix is added to to an equal weight of molten aluminum host metal and stirred. The melt is cast in a conventional manner. The resultant second composite comprises about 25 weight percent $[Ti,Nb]_xB_y$ whiskers dispersed within an aluminum intermediate metal matrix.

EXAMPLE 29

A second composite comprising $TiB_2$ particles within an aluminum intermediate metal matrix is prepared in a manner similar to Example 20, with the exception that the $TiB_2$ particles comprise about 19 weight percent of the composite. Nineteen pounds of this second composite are added to 28.5 pounds of molten titanium intermetallic precursor metal under vacuum using induction stirring. The resultant melt is then cast to yield a final composite comprising about 7.5 weight percent $TiB_2$ particles in a Ti-45Al (55 atomic percent Ti, 45 atomic percent Al) intermetallic matrix. X-ray, SEM and chemical analyses of the final composite reveal equiaxed $TiB_2$ second phase particles having an average size of approximately 3 microns substantially uniformly dispersed throughout an intermetallic matrix consisting essentially of $Ti_3Al$ and $TiAl$ having an equiaxed colony structure. The impurity content of the final composite is very low, with less than 0.2 atomic percent oxygen, less than 0.03 atomic percent nitrogen, less than 0.003 atomic percent hydrogen and less than 0.03 atomic percent carbon. The average colony size of the as-cast final intermetallic matrix is less than about 30 microns.

EXAMPLE 30

A second composite comprising TiC particles within an aluminum intermediate metal matrix is prepared as in Example 19. Sixteen pounds of this second composite are added to 25.5 pounds of molten titanium intermetallic precursor metal under vacuum. The resultant melt is then cast to yield a final composite comprising about 7.5 weight percent TiC particles in a Ti-45Al (55 atomic percent Ti, 45 atomic percent Al) intermetallic matrix. X-ray, SEM and chemical analyses of the final composite reveal TiC second phase particles dispersed throughout an intermetallic matrix consisting essentially of $Ti_3Al$ and $TiAl$. The impurity content of the final composite is very low, with less than 0.2 atomic percent oxygen, less than 0.03 atomic percent nitrogen, less than 0.002 atomic percent hydrogen and less than 1.2 atomic percent carbon.

EXAMPLE 31

A second composite comprising $[Ti,Nb]_xB_y$ whiskers dispersed within an aluminum intermediate metal matrix is prepared in a manner similar to Example 28 and then added to molten titanium intermetallic precursor metal under vacuum in the proper amount to form a final composite comprising an intermetallic matrix of Ti-45Al (55 atomic percent Ti, 45 atomic percent Al) having approximately 7.5 weight percent $[Ti,Nb]_xB_y$ second phase dispersed therein. Analyses of the resultant final composite reveal $[Ti,Nb]_xB_y$ second phase whiskers substantially uniformly dispersed throughout an intermetallic matrix comprising $Ti_3Al$ and $TiAl$ having an equiaxed grain structure.

EXAMPLE 32

14.7 grams of a second composite, prepared as in Example 20, comprising about 23 weight percent $TiB_2$ second phase particles within an aluminum intermediate metal matrix are added along with 5.4 pounds of aluminum shot to 25.0 pounds of molten titanium intermetallic precursor metal under vacuum. The resultant melt is then cast to yield a final composite comprising about 7.5 weight percent TiB$_2$ particles in a Ti-54Al (46 atomic percent Ti, 54 atomic percent Al) intermetallic matrix. X-ray and SEM analyses of the final composite reveal equiaxed TiB$_2$ second phase particles substantially uniformly dispersed throughout an intermetallic matrix consisting essentially of TiAl.

EXAMPLE 33

12.2 grams of a second composite, prepared as in Example 20, comprising about 23 weight percent TiB$_2$ second phase particles within an aluminum intermediate metal matrix are added along with 14.7 pounds of aluminum shot to 13.2 pounds of molten titanium intermetallic precursor metal under vacuum. The resultant melt is then cast to yield a final composite comprising about 7.5 weight percent TiB$_2$ particles in an Al-25Ti (75 atomic percent Al, 25 atomic percent Ti) intermetallic matrix. X-ray and SEM analyses of the final composite reveal equiaxed TiB$_2$ second phase particles substantially uniformly dispersed throughout an intermetallic matrix consisting essentially of TiAl$_3$.

EXAMPLE 34

A second composite comprising TiB$_2$ second phase particles dispersed within an aluminum intermediate metal matrix is prepared in a manner similar to Example 20 and then added to molten titanium intermetallic precursor metal under vacuum in the proper amount to form a final composite comprising an intermetallic matrix of Ti-25Al (75 atomic percent Ti, 25 aotmic percent Al) having approximately 7.5 weight percent second phase dispersed therein. Analyses of the resultant final composite reveal that a substantial proportion of the TiB$_2$ second phase particles present in the second composite are converted to TiB particles in the final composite. The intermetallic matrix of the final composite comprises Ti$_3$Al.

EXAMPLE 35

A second composite comprising TiB$_2$ second phase particles dispersed within an aluminum intermediate metal matrix is prepared in a manner similar to Example 20 and then added to molten nickel intermetallic precursor metal under vacuum in the proper amount to form a final composite comprising an intermetallic matrix of Ni-25Al (75 atomic percent Ni, 25 atomic percent Al) having approximately 7.5 weight percent TiB$_2$ dispersed therein. Analyses of the resultant final composite reveal TiB$_2$ second phase particles substantially uniformly dispersed throughout an intermetallic matrix comprising Ni$_3$Al.

EXAMPLE 36

A second composite comprising TiB$_2$ second phase particles dispersed in a Co intermediate metal matrix is prepared in a manner similar to Example 26 and then added to molten silicon intermetallic precursor metal under vacuum in the proper amount to form a final composite comprising an intermetallic matrix of Si-33Co (67 atomic percent Si, 33 atomic percent Co) having approximately 7.5 weight percent TiB$_2$ dispersed therein. Analyses of the resultant final composite reveal TiB$_2$ second phase particles dispered throughout an intermetallic matrix comprising CoSi$_2$.

EXAMPLE 37

A second composite comprising TiB$_2$ second phase particles dispersed in a Cr intermediate metal matrix is prepared in a manner similar to Example 27 and then added to molten silicon intermetallic precursor metal under vacuum in the proper amount to form a final composite comprising an intermetallic matrix of Cr-33Si (67 atomic percent Cr, 33 atomic percent Si) having approximately 7.5 weight percent TiB$_2$ dispersed therein. Analyses of the resultant final composite reveal TiB$_2$ second phase particles dispersed throughout an intermetallic matrix comprising Cr$_2$Si.

EXAMPLE 38

A first composite is prepared as in Example 12, comprising [Ti,Nb]$_x$B$_y$ second phase whiskers in an aluminum solvent metal matrix. Another first composite is prepared as in Example 17, comprising TiN second phase particles in an aluminum solvent metal matrix. These first composites are both added to molten aluminum host metal to yield a second composite comprising both [Ti,Nb]$_x$B$_y$ and TiN second phase particles dispersed in an aluminum intermediate metal matrix. This second composite is then mixed with solid Nb intermetallic precursor metal, and the mixture melted to form a final composite comprising [Ti,Nb]$_x$B$_y$ and TiN second phase particles dispersed in a Nb$_2$Al intermetallic matrix.

EXAMPLE 39

A first composite is prepared as in Example 12, comprising [Ti,Nb]$_x$B$_y$ second phase whiskers in an aluminum solvent metal matrix. Another first composite is prepared as in Example 17, comprising TiN second phase particles in an aluminum solvent metal matrix. These first composites are both added to molten aluminum host metal to yield a second composite comprising both [Ti,Nb]$_x$B$_y$ and TiN second phase particles dispersed in an aluminum intermediate metal matrix. This second composite is then mixed with solid Ti intermetallic precursor metal and solid Nb alloying metal. The resultant mixture is melted to form a final composite comprising [Ti,Nb]$_x$B$_y$ and TiN second phase particles dispersed in a Ti-45Al-4Nb intermetallic matrix.

EXAMPLE 40

A second composite comprising TiC second phase particles dispersed within an aluminum intermediate metal matrix is prepared in a manner similar to Example 19 and then added to molten titanium intermetallic precursor metal under vacuum in the proper amount to form a final composite comprising an intermetallic matrix of Ti-24Al-11Nb (65 atomic percent Ti, 24 atomic percent Al, 11 atomic percent Nb) having approximately 6.5 weight percent TiC dispersed therein. Analyses of the resultant final composite reveal TiC second phase particles dispersed throughout an intermetallic matrix comprising Ti-24Al-11Nb. A small of amount of Ti$_3$AlC is also present in the final composite.

It should be noted that the process disclosed herein for making intermetallic-second phase composites has a number of advantages over prior art techniques for preparing intermetallic materials. For example, the present process circumvents the need for micron sized, unagglomerated second phase particles, which particles are not normally commercially available, and which are often pyrophoric. The present process also eliminates the technical problems of uniformly dispersing a second phase in an intermetallic, and avoids the problem of oxides at the intermetallic-second phase interface.

The intermetallic-second phase composites of the present invention possess enhanced mechanical properties, such as high elastic modulus, high-temperature stability, ductility, and improved wear and creep resistance. Of particular importance is the property of fine grain size which imparts greater ductility to these materials than heretofore attainable with intermetallics processed by prior art techniques. The composites of the present invention also have improved high temperature stability, since the second phase is selected such that it is substantially non-reactive with the matrix. As a result, the composites can be remelted and recast and may also be welded while maintaining relatively uniformly dispersed discrete fine particles. Further, composites of the present invention are also capable of being formed by conventional ingot metallurgy techniques such as extruding, forging and rolling.

It is understood that the above description of the present invention is susceptible to considerable modification change, and adaptation by those skilled in the art, and such modifications, changes, and adaptations are intended to be considered to be within the scope of the present invention, which is set forth by the appended claims.

We Claim:

1. A method for forming intermetallic-second phase composite materials, the method comprising contacting reactive second phase-forming constituents and a solvent metal at a temperature sufficient to initiate an exothermic reaction of the second phase-forming constituents to thereby form a first composite comprising a dispersion of second phase particles within a solvent metal matrix, introducing the first composite into a host metal to form a second composite comprising a dispersion of the second phase particles within an intermediate metal matrix, introducing the second composite into an intermetallic precursor metal which is reactive with the intermediate metal matrix to form an intermetallic containing matrix, and recovering a final composite comprising an intermetallic containing matrix having second phase particles dispersed therein.

2. A method as set forth in claim 1, wherein said solvent metal is selected from the group consisting of aluminum, nickel, copper, titanium, cobalt, iron, platinum, gold, silver, niobium, tantalum, boron, lead, zinc, molybdenum, yttrium, hafnium, tin, tungsten, lithium, magnesium, beryllium, thorium, silicon, chromium, vanadium, zirconium, manganese, scandium, lanthanum, cerium and erbium.

3. A method as set forth in claim 1, wherein said host metal is selected from the group consisting of aluminum, nickel, copper, titanium, cobalt, iron, platinum, gold, silver, niobium, tantalum, boron, lead, zinc, molybdenum, yttrium, hafnium, tin, tungsten, lithium, magnesium, beryllium, thorium, silicon, chromium, vanadium, zirconium, manganese, scandium, lanthanum, cerium and erbium.

4. A method as set forth in claim 1, wherein said intermetallic precursor metal is selected from the group consisting of aluminum, nickel, copper, titanium, cobalt, iron, platinum, gold, silver, niobium, tantalum, boron, lead, zinc, molybdenum, yttrium, hafnium, tin, tungsten, lithium, magnesium, beryllium, thorium, silicon, chromium, vanadium, zirconium, manganese, scandium, lanthanum, cerium and erbium.

5. A method as set forth in claim 1, wherein said second phase-forming constituents are selected from the group consisting of aluminum, titanium, zirconium, hafnium, vanadium, niobium, tantalum, chromium, molybdenum, tungsten, iron, cobalt, nickel, copper, silicon, boron, carbon, sulfur, nitrogen, oxygen, thorium, scandium, lanthanum, yttrium, cerium and erbium.

6. A method as set forth in claim 1, wherein the second phase-forming constituents and the solvent metal are provided in the form of elemental powders.

7. A method as set forth in claim 1, wherein at least one of the second phase-forming constituents is provided as an alloy of the solvent metal.

8. A method as set forth in claim 1, wherein at least one of the second phase-forming constituents is provided from a compound.

9. A method as set forth in claim 8, wherein the compound is selected from the group consisting of $BN$, $B_4C$, $B_2O_3$, $AlB_{12}$, $Al_4C_3$, $AlN$, $SiC$, $CuO$ and $Fe_2O_3$.

10. A method as set forth in claim 1, wherein the intermetallic containing matrix comprises an aluminide of titanium, nickel, cobalt or niobium.

11. A method as set forth in claim 1, wherein the intermetallic containing matrix comprises a mixture of intermetallic materials.

12. A method as set forth in claim 1, wherein the intermetallic containing matrix comprises $TiAl$, $Ti_3Al$, or a combination thereof.

13. A method as set forth in claim 1, wherein the intermetallic containing matrix comprises $TiAl$, $TiAl_3$ or a combination thereof.

14. A method as set forth in claim 1, wherein said second phase is selected from the group consisting of borides, carbides, nitrides, oxides, silicides and sulfides of at least one transition metal of the fourth to sixth groups of the Periodic Table.

15. A method as set forth in claim 1, wherein plural second phase materials are produced.

16. A method as set forth in claim 1, wherein the second phase particles comprise from about 20 to about 80 volume percent of the first composite.

17. A method as set forth in claim 16, wherein the second phase particles comprise from about 2 to about 60 volume percent of the second composite.

18. A method as set forth in claim 17, wherein the second phase particles comprise from about 1 to about 40 volume percent of the final composite.

19. A method as set forth in claim 18, wherein the size of the second phase particles is from about 0.01 to about 10 microns.

20. A method as set forth in claim 1, wherein the solvent metal is aluminum or an alloy thereof.

21. A method as set forth in claim 20, wherein the host metal is aluminum or an alloy thereof.

22. A method as set forth in claim 21, wherein the intermetallic precursor metal is titanium or an alloy thereof.

23. A method as set forth in claim 22, wherein one of the second phase-forming constituents is selected from the group consisting of boron, carbon, nitrogen, oxygen and silicon, and at least one other second phase-forming constituent is selected from the group consisting of titanium, zirconium, hafnium, vanadium, niobium, tantalum, chromium, molybdenum and tungsten.

24. A method as set forth in claim 1, wherein an additional amount of the solvent metal is introduced along with the second composite into the intermetallic precursor metal.

25. A method as set forth in claim 1, wherein an additional amount of the first composite is introduced along with the second composite into the intermetallic precursor metal.

26. A method as set forth in claim 1, wherein metal alloying additions are made during the introduction of the first composite into the host metal.

27. A method as set forth in claim 1, wherein metal alloying additions are made during the introduction of the second composite into the intermetallic precursor metal.

28. A method for forming intermetallic-second phase composite materials, the method comprising the steps of:
   (a) introducing a first composite comprising a dispersion of in-situ precipitated second phase particles in a solvent metal matrix into a host metal which combines with the solvent metal matrix to form an intermediate metal matrix, to thereby form a second composite comprising a dispersion of the second phase particles within the intermediate metal matrix;
   (b) introducing the second composite into an intermetallic precursor metal which is reactive with the intermediate metal matrix to form an intermetallic; and
   (c) recovering a final composite comprising a dispersion of second phase particles within an intermetallic containing matrix.

29. A method for forming intermetallic-second phase composite materials, the method comprising the steps of:
   (a) preparing a mixture comprising reactive second phase-forming constituents and at least one solvent metal;
   (b) heating the mixture to initiate a reaction of the second phase-forming constituents, thereby forming a first composite comprising a dispersion of second phase particles within a solvent metal matrix;
   (c) diluting the first composite in a host metal, thereby forming a second composite comprising a dispersion of the second phase particles within an intermediate metal matrix;
   (d) introducing the second composite into an intermetallic precursor metal which is reactive with the intermediate metal matrix to form an intermetallic; and
   (e) recovering a final composite comprising a dispersion of second phase particles within an intermetallic containing matrix.

30. A method as set forth in claim 29, wherein the mixture is compressed to form a compact prior to the heating thereof.

31. A method as set forth in claim 30, wherein the heating is achieved by bulk heating the compact.

32. A method as set forth in claim 30, wherein the heating is achieved by igniting a substantially localized portion of the compact.

33. A method as set forth in claim 30, wherein the heating is achieved by adding the compact to a molten bath comprising an additional amount of the solvent metal.

34. A method as set forth in claim 29, wherein the first composite is diluted in the host metal by adding the first composite to a molten bath of the host metal.

35. A method as set forth in claim 29, wherein the first composite is diluted in the host metal by contacting the first composite and the host metal in solid form and then heating to a temperature sufficient to melt the solvent metal matrix of the first composite and the host metal.

36. A method as set forth in claim 35, wherein heating of the first composite and the host metal is achieved by arc melting.

37. A method as set forth in claim 29, wherein the second composite is introduced into the intermetallic precursor metal by adding the second composite to a molten bath of the intermetallic precursor metal.

38. A method as set forth in claim 29, wherein the second composite is introduced into the intermetallic precursor metal by contacting the second composite and the intermetallic precursor metal in solid form and then heating to a temperature sufficient to melt the intermediate metal matrix of the second composite and the host metal.

39. A method as set forth in claim 38, wherein heating of the second composite and the intermetallic precursor metal is achieved by arc melting.

40. A method as set forth in claim 29, wherein the intermetallic containing matrix comprises an aluminide of Ti, Ni, Co, Nb, Zr, Fe, Mo, V, or Ta.

41. A method as set forth in claim 29, wherein the intermetallic containing matrix comprises a silicide of Ti, Cr, Co, Ni, V, or Nb.

42. A method as set forth in claim 29, wherein the intermetallic containing matrix comprises at least one intermetallic selected from the group consisting of $Ti_3Al$, $TiAl$, $TiAl_3$, $Ni_3Al$, $NiAl$, $Nb_3Al$, $NbAl_3$, $Co_3Al$, $ZrAl_3$, $ZrAl_2$, $Zr_2Al_3$, $Zr_4Al_3$, $Zr_3Al_2$, $Zr_3Al$, $Fe_3Al$, $Ta_2Al$, $TaAl_3$, $Mo_3Al$, $MoAl_2$, $VAl_3$, $VAl$, $Ti_5Si_3$, $Nb_5Si_3$, $Cr_3Si$, $Cr_2Si$, $V_5Si_3$, $Ni_3Si$, $CoSi_2$ and $Cr_2Nb$.

43. A method as set forth in claim 29, wherein said second phase is selected from the group consisting of borides, carbides, nitrides, oxides, silicides and sulfides of at least one transition metal of the fourth to sixth groups of the Periodic Table.

44. A method as set forth in claim 29, wherein said second phase is selected from the group consisting of $TiB_2$, $ZrB_2$, $HfB_2$, $VB_2$, $NbB_2$, $TaB_2$, $MoB_2$, $TiC$, $ZrC$, $HfC$, $VC$, $NbC$, $TaC$, $WC$, $TiN$, $Ti_5Si_3$, $Nb_5Si_3$, $ZrSi_2$, $MoSi_2$, $MoS_2$, and combinations thereof.

45. A method as set forth in claim 29, wherein said second phase comprises a complex compound selected from the group consisting of borides, carbides, or nitrides of at least two transition metals of the fourth to sixth groups of the Periodic Table.

46. A method as set forth in claim 29, wherein said second phase particles comprise from about 1 to about 40 volume percent of the final composite.

47. A method as set forth in claim 29, wherein the size of the second phase particles is from about 0.01 to about 10 microns.

48. A method as set forth in claim 29, wherein the intermetallic containing matrix has a grain size of less than about 200 microns.

49. A method as set forth in claim 29, wherein the intermetallic containing matrix has a grain size of less than about 40 microns.

50. A method as set forth in claim 29, wherein the second phase comprises $TiB_2$ and the intermetallic containing matrix comprises Ti-45Al.

51. A method as set forth in claim 29, wherein the second phase comprises TiC and the intermetallic containing matrix comprises Ti-45Al.

* * * * *